United States Patent
Walker et al.

[11] Patent Number: 6,041,949
[45] Date of Patent: Mar. 28, 2000

[54] OVERHEAD LIFTER FOR ELECTRICAL SWITCHING APPARATUS

[75] Inventors: Steven D. Walker, Arden; William Edward Wilkie, II; Daniel E. Hrncir, Jr., both of Fletcher, all of N.C.; Kenneth W. Tucker, Denison, Tex.; John H. Dileo, Pittsburgh, Pa.

[73] Assignee: Eaton Corporation, Cleveland, Ohio

[21] Appl. No.: 09/301,940

[22] Filed: Apr. 29, 1999

[51] Int. Cl.⁷ ................................................. B66C 17/06
[52] U.S. Cl. ........................... 212/179; 212/71; 212/331; 218/98
[58] Field of Search ................................ 218/98; 212/179, 212/71, 330, 331; 414/542, 544

[56] References Cited

U.S. PATENT DOCUMENTS

| | | |
|---|---|---|
| 3,572,513 | 3/1971 | Tantilinger et al. ...................... 212/10 |
| 4,126,232 | 11/1978 | Orawiec . |
| 5,062,760 | 11/1991 | Samaniego ............................... 212/267 |
| 5,338,147 | 8/1994 | Kucharczyk et al. ................... 414/542 |
| 5,743,702 | 4/1998 | Gunderson ............................... 414/542 |

*Primary Examiner*—Thomas J. Brahan
*Attorney, Agent, or Firm*—Martin J. Moran

[57] ABSTRACT

A lifting assembly for lifting an electrical switching apparatus for placement in an electrical cabinet includes a support frame moveable along first and second rail members mounted on the electrical cabinet. The lifting assembly also includes a winch having a spool, and a cable having a first end attached to the winch and a second end for lifting the electrical switching apparatus. The cable passes over a pivotable, rotatable cable support member mounted upon the support frame to provide even distribution of the cable on the spool. A plurality of wheels rotatable about either a horizontal axis or vertical axes are attached to the support frame for movement of the support frame along the rail members.

18 Claims, 6 Drawing Sheets

OVERHEAD LIFTER FOR ELECTRICAL SWITCHING APPARATUS

BACKGROUND OF THE INVENTION

1. Field of the Invention

The invention relates generally to electrical switching apparatus and, more particularly, to a lifting assembly for lifting electrical switching apparatus for placement in an electrical cabinet.

2. Background Information

Electrical switching apparatus for opening and closing electrical distribution circuits are well known in the art. Such electrical switching apparatus includes power circuit breakers and network protectors which provide protection, and electrical switches which are used to energize and deenergize parts of the circuit or to transfer between alternative power sources.

It is also known to house electrical switching apparatus within an electrical cabinet, such as, for example, a switchgear cabinet for the distribution of electrical power from incoming utility lines to electrical loads distributed throughout a building or other facility. Typically, a plurality of electrical switching apparatus, such as power circuit breakers, are removably mounted within a plurality cells in the electrical cabinet. Such electrical switching apparatus may vary in size and may weigh up to several hundred pounds. Therefore, means must be provided to lift the electrical switching apparatus to properly position the electrical switching apparatus for insertion into their respective cells.

It is known to provide a rail mounted lifter positioned on or adjacent a top side of an electrical cabinet for lifting the electrical switching apparatus for insertion into the cells of the electrical cabinet. One such lifter includes a cantilevered portion that extends outwardly from the electrical cabinet where the lifter includes a winch assembly for connecting to and lifting the electrical switching apparatus. The winch assembly includes a spool for winding a cable thereon. It has been found that often the cable does not wind evenly onto the spool of the winch assembly. The cable has a tendency to accumulate on one area of the spool causing sporadic jumping as the spool turns and releases or retracts the cable. This can result in sudden drops to the electrical switch apparatus during lifting. Of course, the uneven winding of the cable on the spool and the resulting sudden drops to the electrical switching apparatus during lifting are undesirable and may possibly result in damage to the electrical switching apparatus and excessive stress and fatigue being applied to the lifter.

It has also been observed that the lifter has a tendency to bind or twist as a result of the load of the electrical switching apparatus being applied on the cantilevered portion of the lifter. This is particularly the situation when the lifter is supporting the weight of the electrical switching apparatus and it is desired to translate or laterally move the lifter along the top of the electrical cabinet.

There is a need, therefore, for an improved lifting assembly for lifting an electrical switching apparatus for placement in an electrical cabinet.

There is also a need for a lifting assembly for lifting an electrical switching apparatus for placement in an electrical cabinet that provides even distribution of the cable on the spool of the winch assembly.

There is a further need for a lifting assembly for lifting an electrical switching apparatus for placement in an electrical cabinet that provides improved lateral stability of the lifting assembly and minimizes binding or twisting of the lifting assembly while supporting the weight of the electrical switching apparatus.

There is yet a further need for an electrical assembly having an electrical cabinet for receiving an electrical switching apparatus having an improved lifting assembly for lifting the electrical switching apparatus for placement in the electrical cabinet.

SUMMARY OF THE INVENTION

These and other needs are satisfied by the invention which is directed to a lifting assembly for lifting an electrical switching apparatus for placement in an electrical cabinet. The lifting assembly includes a first rail member horizontally disposed adjacent a top surface of the electrical cabinet where the first rail member is generally parallel to and positioned adjacent a front surface of the electrical cabinet. The lifting assembly also includes a second rail member horizontally disposed adjacent the top surface of the electrical cabinet where the first rail member is generally parallel to and spaced apart from the second rail member. The lifting assembly further includes a support frame and wheel means mounted on the support frame for providing movement of the support frame along the first rail member and the second rail member. A winch having a spool is provided for cooperating with a cable having a first end attached to the winch and a second end for securing to the electrical switching apparatus and lifting of the same. The lifting assembly includes a pivotable, rotatable cable support member mounted upon the support frame to provide even distribution of the cable on the spool. The cable support member guides the winding of the cable onto the spool of the winch where the cable would otherwise be wound on the spool due to its own natural tendency. The pivotable, rotatable cable support member of the invention prevents the cable from accumulating on one area of the spool which may result in sporadic jumping or sudden drops as the spool turns and releases or retracts the cable.

The wheel means for mounting on the support frame and providing movement of the support frame on the first rail member and the second rail member preferably includes at least one wheel rotatable about a horizontal axis for movement on the second rail member. The wheel means also preferably includes at least one wheel rotatable about a horizontal axis for movement on the first rail member and at least two wheels rotatable about vertical axes also for movement on the first rail member. This wheel configuration provides support for the lifting assembly and also provides lateral stability to the lifting assembly and minimizes binding or twisting of the lifting assembly during lifting of the electrical switching apparatus.

The invention is also directed to an electrical assembly comprising an electrical cabinet, an electrical switching apparatus, and a lifting assembly for lifting the electrical switching apparatus for placement in the electrical cabinet.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
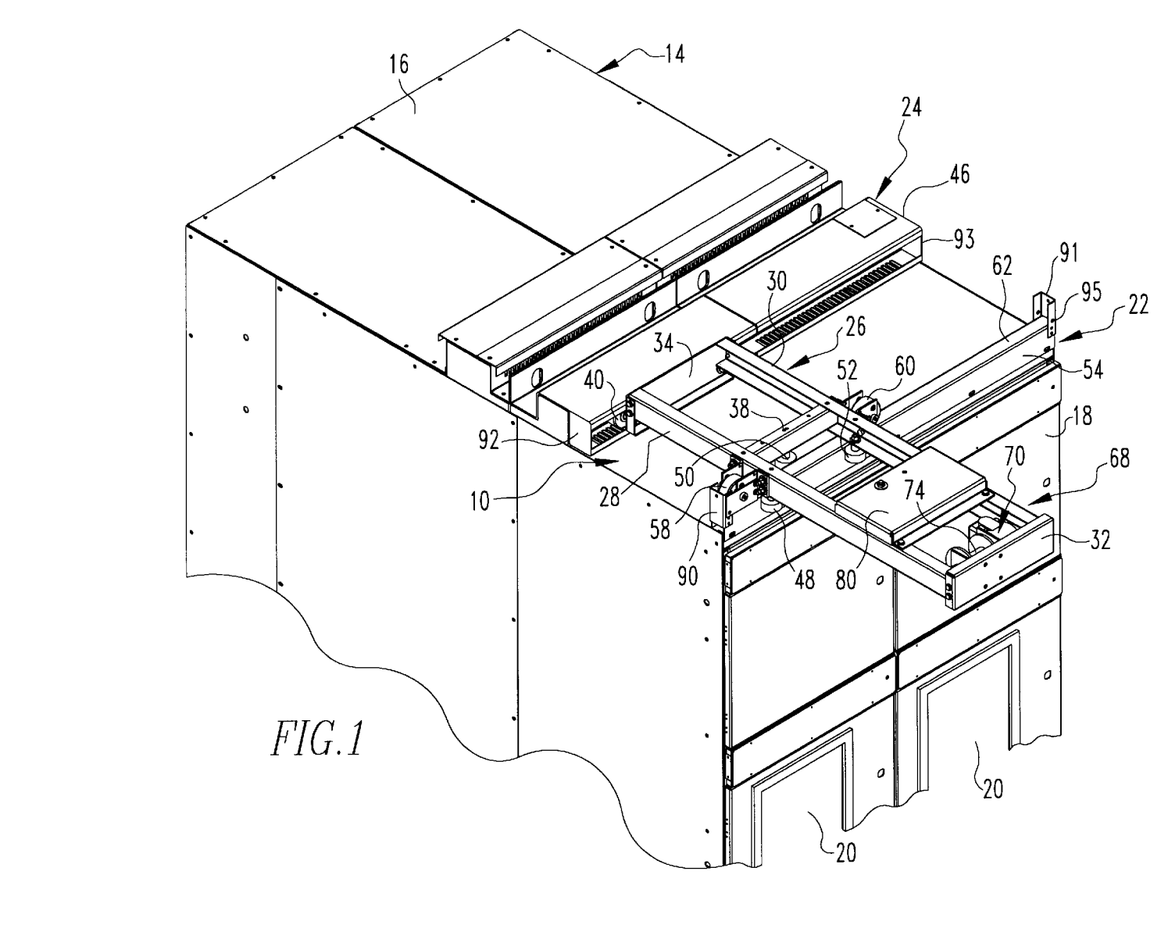
FIG. 1 is a partial, isometric view illustrating a lifting assembly of the invention as mounted on an electrical cabinet.
Figure 3:
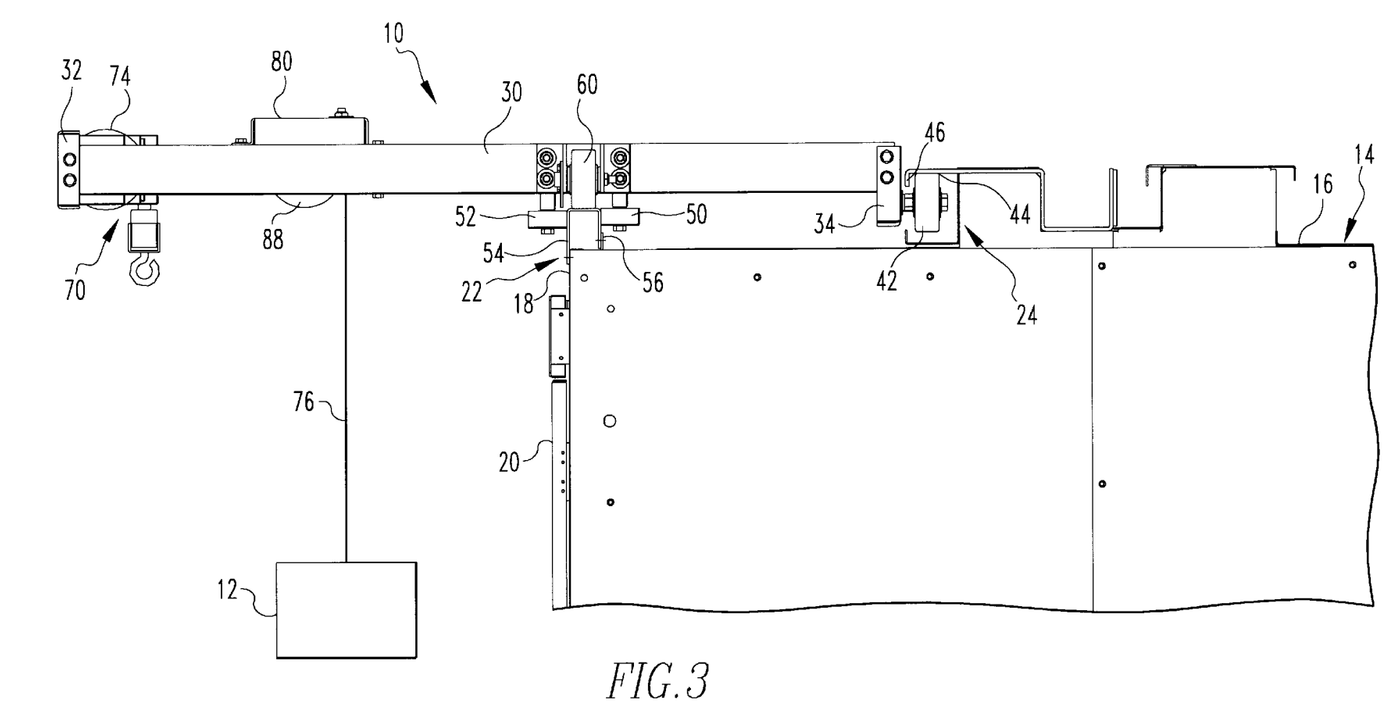
FIG. 3 is a side elevation view of the lifting assembly and the upper portion of the electrical cabinet shown in FIG. 1, also illustrating an electrical switching apparatus to be lifted by the lifting assembly.

Referring to FIG. 1, there is illustrated a lifting assembly 10 of the invention for lifting an electrical switching apparatus, such as a circuit breaker 12 (see FIG. 3), for placement in an electrical cabinet 14. The lifting assembly 10 is mounted on a top surface 16 of the electrical cabinet 14, as will be described in more detail herein. The electrical cabinet 14 also has a front surface 18 and a plurality of cells 20 each adapted to receive a circuit breaker 12 or other electrical switching apparatus.

The lifting assembly 10 is mounted on or adjacent the top surface 16 of the electrical cabinet 14 for lateral movement across the top surface 16 upon a first rail member 22 and a second rail member 24. The first rail member 22 and the second rail member 24 are generally horizontally disposed adjacent the top surface 16 of the electrical cabinet 14 and are preferably mounted to the top surface 16 by fastening means (not shown). The first rail member 22 is generally parallel to and positioned adjacent the front surface 18 of the electrical cabinet 14. The second rail member 24 is generally parallel to the first rail member 22 and is spaced apart from and positioned rearwardly from the first rail member 22. Preferably, the first rail member 22 and the second rail member 24 extend the full width of the electrical cabinet 14.

Figure 2:
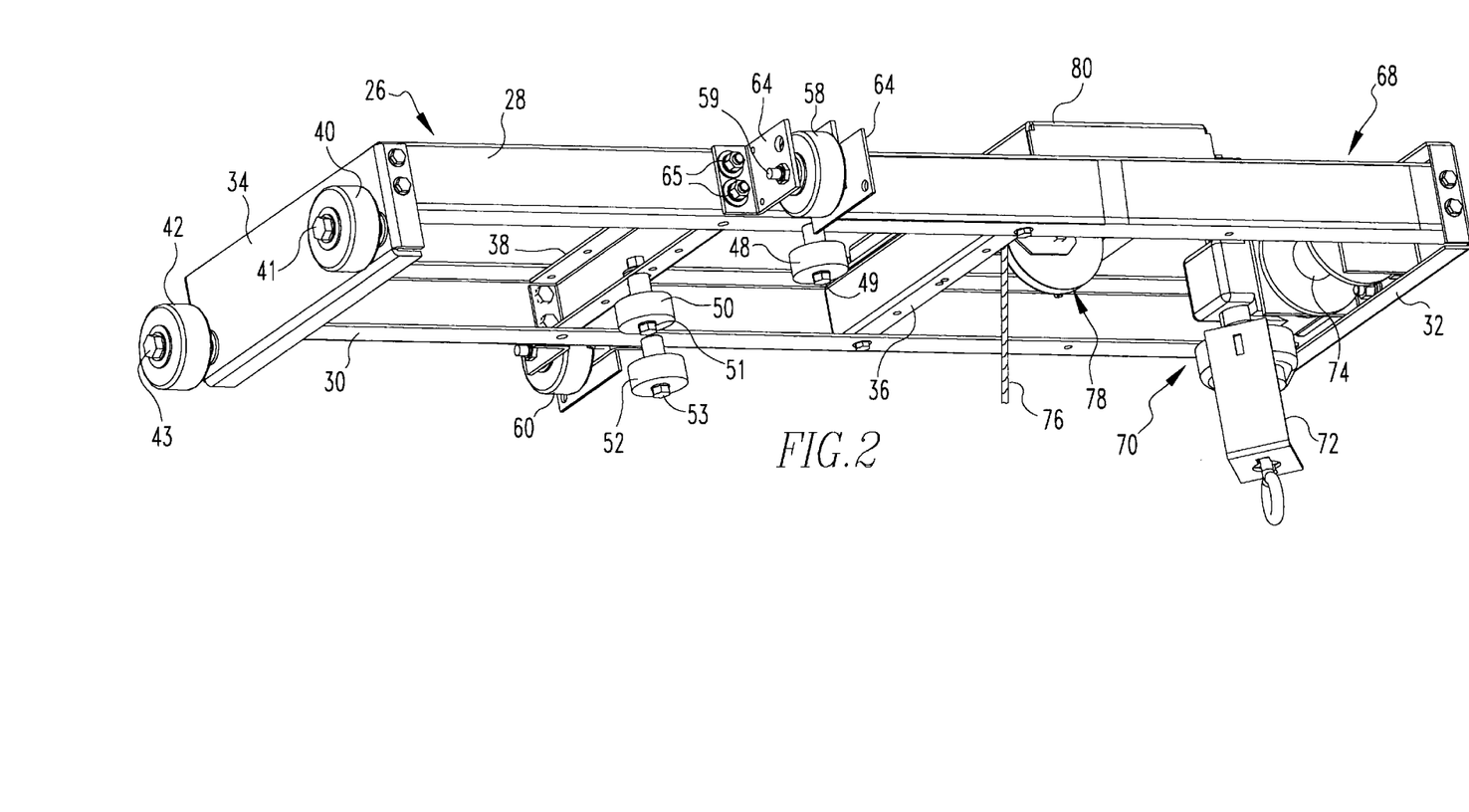
FIG. 2 is an isometric view of the lifting assembly of the invention as seen from below and to one side.

The lifting assembly 10 includes a generally rectangular support frame 26. The support frame 26 is constructed of, for example, a plurality of steel channel members which may be, for example, generally U-shaped and L-shaped. These channel members are bolted together to form the generally rectangular support frame 26. Specifically, the support frame 26 includes a first side member 28, a second side member 30, a first end member 32 and a second end member 34. A first cross-member 36 and a second cross-member 38 extend between the first side member 28 and the second side member 30 to provide structural support for the support frame 26. It will be appreciated that the first end member 32, the second end member 34, and the cross-members 36 and 38 are preferably positioned generally transverse to the first side member 28 and the second side member 30.

The lifting assembly 10 also includes a plurality of wheels mounted to the support frame 26 to permit movement of the support frame 26 on the first rail member 22 and the second rail member 24. Specifically, wheels 40 and 42 are mounted on the second end member 34 by shoulder bolts 41 and 43, respectively, as can be seen in FIG. 2. The shoulder bolts 41 and 43 are connected to the second end member 34 to allow for the wheels 40 and 42 to be rotatable about a generally horizontal axis extending through a longitudinal axis of shoulder bolts 41 and 43 for movement on the second rail member 24. Specifically, wheels 40 and 42 are in engagement with an upper surface 44 of a top flange 46 of the second rail member 24 (see FIG. 3). This configuration provides for structural support between the support frame 26 and the second rail member 24, as will be described in more detail herein.

Wheels 48, 50 and 52 are mounted to the support frame 26 for movement on the first rail member 22. Specifically, wheel 48 is mounted by shoulder bolt 49 to the first side member 28. Wheel 50 is mounted by shoulder bolt 51 to the second cross-member 38. Wheel 52 is mounted by shoulder bolt 53 to the second side member 30. Wheels 48, 50 and 52 are mounted on shoulder bolts 49, 51 and 53, respectively, for rotation about vertical axes extending through a longitudinal axis of the shoulder bolts 49, 51 and 53. Wheels 48 and 52 are in engagement with a first side 54 of the first rail member 22. Wheel 50 is in engagement with a second side 56 (see FIG. 3) of first rail member 22. Wheels 48 and 52 are positioned on the first side member 28 and the second side member 30, respectively, for engagement with the first side 54 of the first rail member 22 and the wheel 50 is positioned at a central location on the second cross-member 38 for movement along the second side 56 of the first rail member 22 to provide lateral stability to the lifting assembly 10 and minimize binding or twisting of the support frame 26 during lifting or translation of the circuit breaker 12. Preferably, wheels 48, 50 and 52 are spaced apart along the first rail member 22 to maximize the lateral stability provided.

To provide support to the lifting assembly 10 and to further minimize the binding or twisting of the support frame 26 during a lifting operation, additional wheels 58 and 60 are provided for movement along a top side 62 of the first rail member 22. Specifically, wheel 58 is mounted by L-shaped brackets 64 to the first side member 28. Bolts 65 secure the L-shaped brackets 64 to the first side member 28. Similarly, L-shaped brackets 66 are mounted and secured to the second side member 30 by bolts 67. Wheels 58 and 60 are in turn mounted to the L-shaped brackets 64 and 66, respectively, by shoulder bolts 59 and 61. Wheels 58 and 60 are mounted for rotation about a horizontal axis extending through a longitudinal axis of the shoulder bolts 59 and 61. By positioning wheels 58 and 60 for movement along a top side 62 of the first rail member 22 in conjunction with the previously described arrangement of wheels 48, 50 and 52, lateral stability of the lifting assembly 10 and minimization of binding and twisting of the support frame 26 are obtained due to the assortment of wheels bearing on the first side 54, the second side 56 and the top side 62 of the first rail member 22. The described wheel configuration allows for the forces applied by the support frame 26 to the first rail member 22 to be evenly distributed and balanced. This provides additional structural stability for the lifting assembly 10.

The support frame 26 includes a cantilevered end, generally designated by reference numeral 68, that extends generally transverse to the first rail member 22 and is cantilevered outwardly from the top surface 16 of the electrical cabinet 14 for lifting the circuit breaker 12. The cantilevered end 68 of the support frame 26 is cantilevered to allow for the circuit breaker 12 to be lifted directly upward adjacent the front surface 18 of the electrical cabinet 14. This allows for the circuit breaker 12 to be maneuvered freely prior to placement in the respective cells 20 of the electrical cabinet 14.

Mounted on the cantilevered end 68 of the support frame 26 is a winch, generally designated by reference numeral 70. The winch 70, as is generally known, includes a crank assembly 72 and a spool 74. A cable 76 is attached to the winch 70 and is wound on the spool 74. The cable 76 extends from the spool 74 and passes over a pivotable, rotatable cable support member, generally designated by reference numeral 78. The cable 76 extends from the cable support member 78 for securing to the circuit breaker 12 for lifting of the same.

Figure 5:
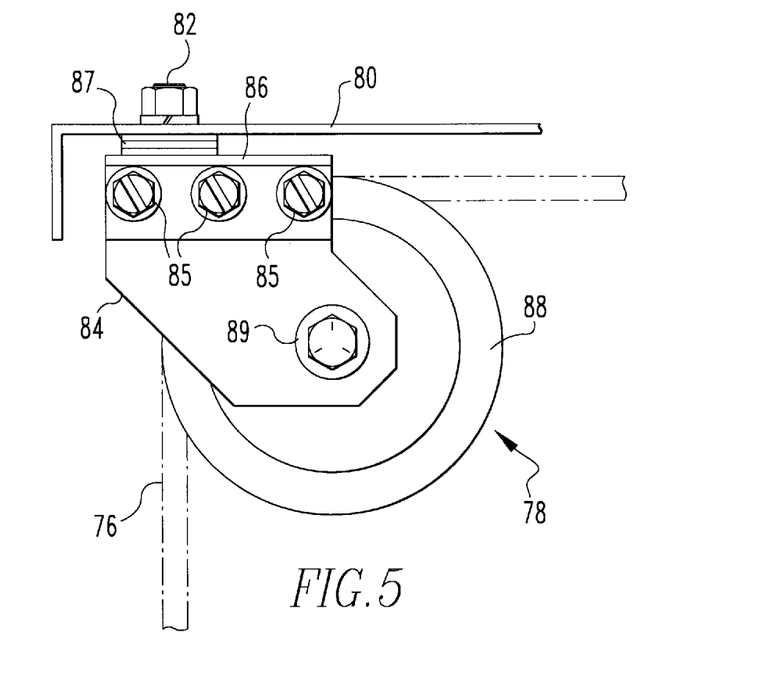
FIG. 5 is a side elevation view of a cable support member of the lifting assembly.
Figure 6:
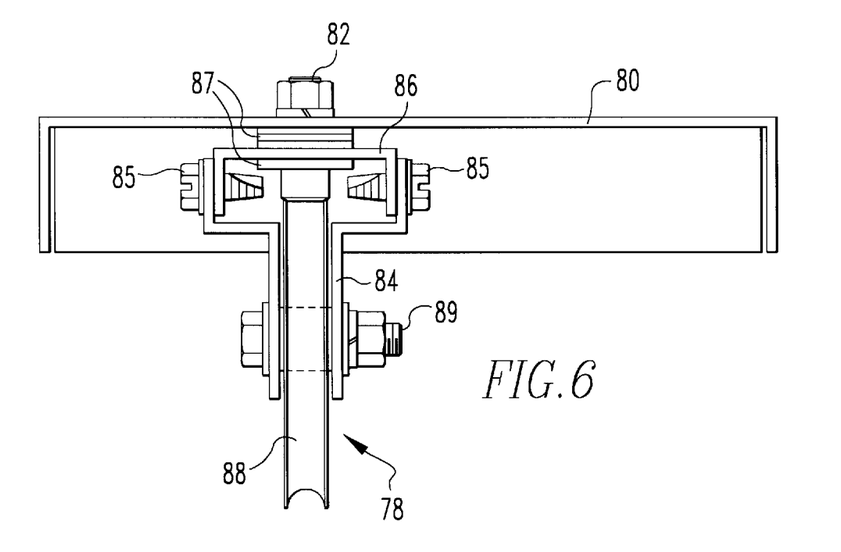
FIG. 6 is a rear elevation view of the cable support member shown in FIG. 5.

The cable support member 78 is mounted to a cable support member housing 80 which in turn is mounted to the first side member 28, the second side member 30 and the first cross-member 36 of the support frame 26. As best shown in FIGS. 5 and 6, a shoulder bolt 82 extends vertically through the cable support member housing 80 for mounting the cable support member 78 thereto.

Figure 4:
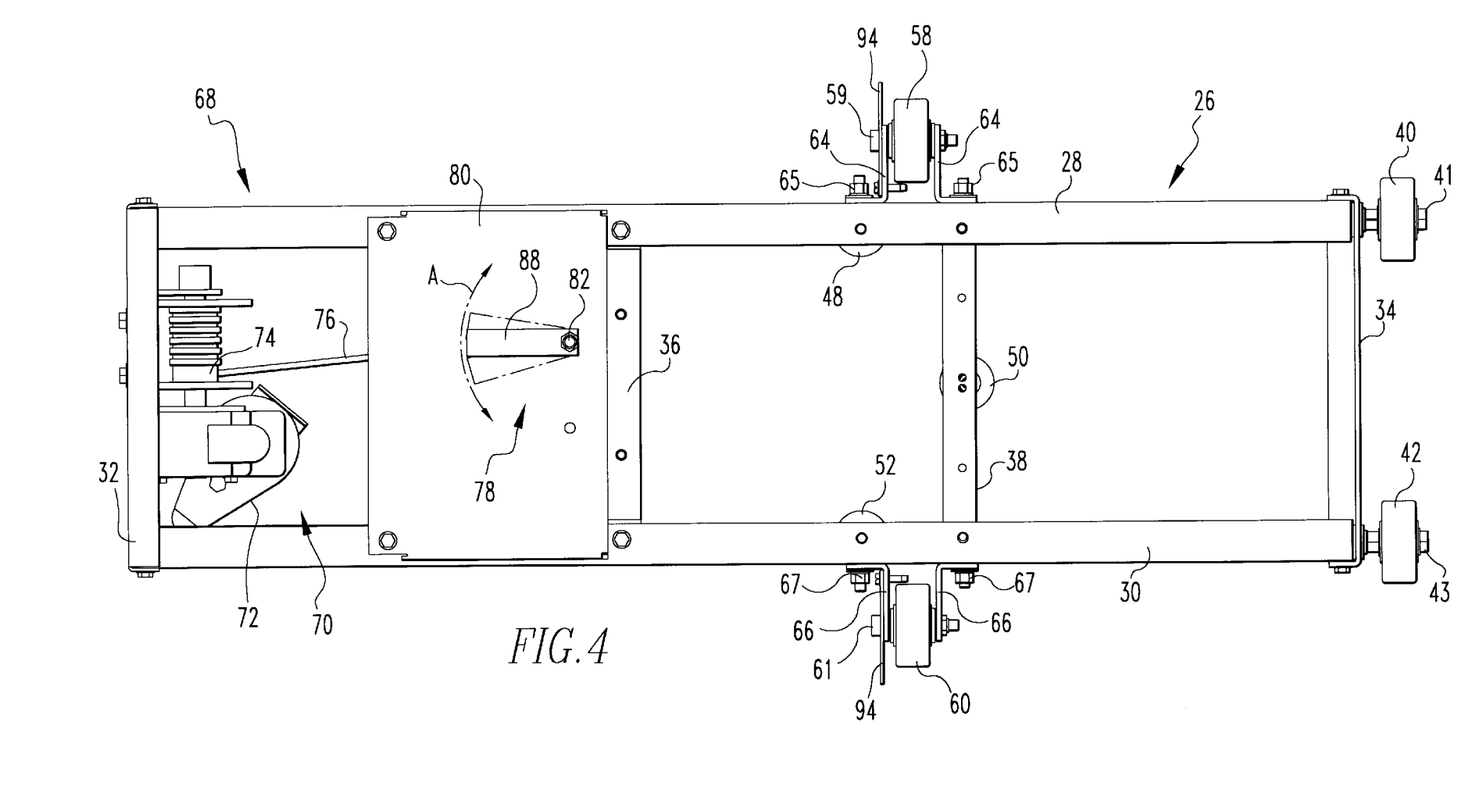
FIG. 4 is a top plan view of the lifting assembly of the invention.

The cable support member 78 includes a first mounting bracket 84 that is secured by screws 85 to a second mounting bracket 86. The second mounting bracket 86 is mounted on shoulder bolt 82 by washers 87 disposed on both sides of the second mounting bracket 86. This allows for the cable support member 78 to be pivotable about the shoulder bolt 82, as best shown in FIG. 4 and illustrated by arrow A. The cable support member 78 further includes a rotatable pulley 88 mounted on a shoulder bolt 89 that extends generally horizontally through the first mounting bracket 84.

As discussed, the cable 76 is wound on the spool 74 and passes over the cable support member 78 and extends to the circuit breaker 12 for attachment thereto. Specifically, the cable 76 is received in the pulley 88. It should be appreciated that the cable 76 may also be attached to, for example, a lifting harness (not shown) for attachment to the circuit breaker 12 for lifting of the same. As the circuit breaker 12 is being lifted, the spool 74 is rotated by the crank assembly 72 and the pulley 88 in turn rotates about the shoulder bolt 89. The cable support member 78 by being pivotable guides the winding of the cable 76 onto the spool 74 to provide even distribution of the cable 76 on the spool 74. As winding of the cable 76 on the spool 74 progresses, the cable support assembly 78 rotates through the arc, as represented by arrow A in FIG. 4, to ensure the even distribution of the cable 76. Advantageously, this prevents the cable 76 from accumulating on one area of the spool 74 which may result in sporadic jumping or sudden drops as the spool 74 turns and releases or retracts the cable 76.

The shoulder bolt 72, about which the cable support member 78 pivots, is generally axially aligned with the portion of the cable 76 extending generally downwardly from the pulley 88 for connection to the circuit breaker 12. As a load is applied to the cable 76 and the load is raised, the cable support assembly 78 is allowed to pivot about shoulder bolt 82 to provide the uniform winding of the cable 76 on the spool 74. The pulley 88 is similar to a castered wheel where the pulley 88 rotates about an axis extending through a longitudinal axis of shoulder bolt 89 and where the shoulder bolt 89 is generally transverse to and offset from the shoulder bolt 82. The pivoting of the cable support assembly 78 enables the cable 76 to follow its natural tendency to wind onto the spool 74, only in a more uniform manner without the accumulation of the cable 76 on one area of spool 74.

As the circuit breaker 12 is being lifted by the cable 76, the weight of the circuit breaker 12 applies a load to the support frame 26. The wheel configurations, described herein, advantageously absorb the load and transfer the same to the rail members 22 and 24 which in turn transfer the load to the electrical cabinet 14. Specifically, the wheels 40, 42, 58 and 60 which rotate about horizontal axes support the load being applied to the support frame 26. The wheels 48, 50 and 52, while also supporting the load, provide lateral stability and minimize bending or twisting of the support frame 26. This is particularly true when the support frame 26 is supporting the weight of the circuit breaker 12 is translated or the support frame 26 is or moved laterally across the top surface 16 of the electrical cabinet 14 such as, for example, by a user manually pulling the crank assembly 72 of the winch 70 in the desired direction. Due to the cantilevered end 68 of the support frame 26 being cantilevered, as described herein, placement of the wheels 48, 50 and 52 and wheels 58 and 60 for movement on the first rail member 22 adjacent the front surface 18 of the electrical cabinet 14 also enhances the structural stability of the support frame 26. Longitudinal movement of the cantilevered end 68 of the support frame 26 along a longitudinal axis of support frame 26 is not typically necessary because the circuit breaker may be easily translated once it is lifted or as is typical the cells 20 may include extendable arms for receiving the circuit breaker 12.

Therefore, it will be appreciated that the wheel configurations of the lifting assembly 10 and the pivotable, rotatable cable support member 78 all contribute to an improved lifting assembly that may be reliably used for lifting an electrical switching apparatus, such as circuit breaker 12, while minimizing stress and fatigue to the lifting assembly 10.

The first rail member 22 may include stop brackets 90 and 91 mounted to opposing ends thereof to prevent the wheels 58 and 60 from becoming disengaged from the first rail member 22. Similarly, stop plates 92 and 93 may be provided on opposing ends of the second rail member 24 to prevent wheels 40 and 42 from becoming disengaged from the second rail member 24.

Figure 7:
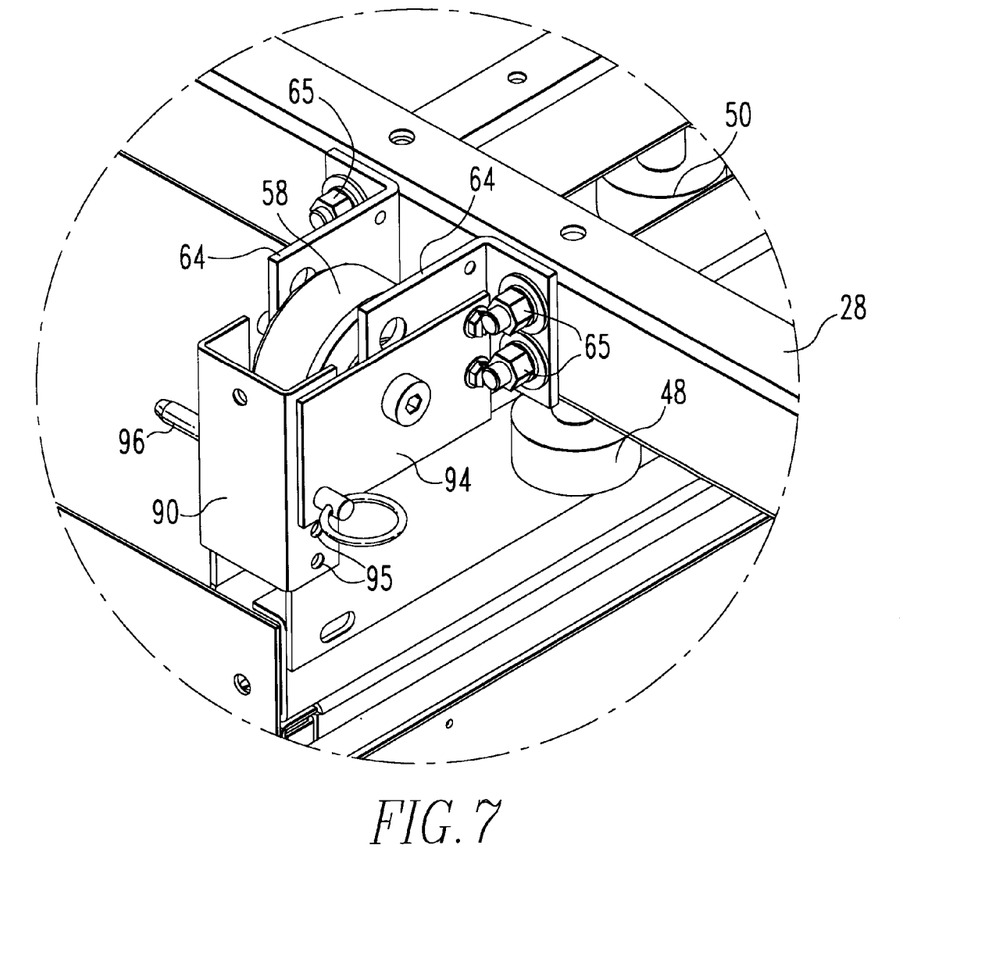
FIG. 7 is a partial, isometric view illustrating a locking means for the lifting assembly.

In addition, a locking plate 94 may be attached to the L-shaped bracket 64 for locking the support frame 26 in position to prevent movement thereof with respect to the first rail member 22 and the second rail member 24. As best shown in FIG. 7, this is accomplished by passing a locking pin 96 through an aperture in the locking plate 94 and one of a plurality of aligning apertures 95 formed on the stop bracket 90. A locking plate 94 may also be provided on the L-shaped brackets 66 for cooperation with aligning apertures 95 formed on the stop bracket 91 (see FIG. 1).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A lifting assembly for lifting an electrical switching apparatus for placement in an electrical cabinet having a front surface and a top surface, the lifting apparatus comprising:

a first rail member adapted to be horizontally disposed adjacent the top surface of the electrical cabinet, said first rail member generally parallel to and positioned adjacent the front surface of the electrical cabinet;

a second rail member adapted to be horizontally disposed adjacent the top surface of the electrical cabinet spaced from and generally parallel to said first rail member;

a support frame;

wheel means mounted on said support frame for providing movement of said support frame along said first rail member and said second rail member;

a winch mounted on said support frame and having a spool;

a cable having a first end wound on said spool and a second end for lifting the electrical switching apparatus; and a pivotable, rotatable cable support member mounted upon said support frame over which said cable passes to provide even distribution of said cable on said spool.

2. The lifting assembly of claim 1 wherein said pivotable, rotatable cable support member is mounted to said support frame by a pivot pin, said pivot pin being generally axially aligned with said second end of said cable extending from said pivotable, rotatable cable support member to the electrical switching apparatus.

3. The lifting assembly of claim 2 wherein said support frame includes a cantilevered end that extends generally transverse to said first rail member and adapted to be cantilevered outwardly from the top surface of the electrical cabinet, said pivotable, rotatable cable support member is mounted by said pivot pin to said cantilevered end of said support frame.

4. The lifting assembly of claim 1 wherein said wheel means includes at least one wheel rotatable about a horizontal axis for movement on said second rail member; and said wheel means also includes at least one wheel rotatable about a horizontal axis for movement on said first rail member and at least two wheels rotatable about vertical axes and spaced apart along said first rail member for movement on said first rail member to provide lateral stability and minimize binding of the lifting assembly.

5. The lifting assembly of claim 4 wherein said first rail member includes a top side and a first side and a second side both adapted to extend generally downwardly from said top side toward the top surface of the electrical cabinet, said at least one wheel rotatable about a horizontal axis positioned for movement on said top side of said first rail member, said at least two wheels rotatable about vertical axes positioned for movement on said first side and said second side of said first rail member.

6. The lifting assembly of claim 4 further including stop means for stopping said at least one wheel rotatable about a horizontal axis from becoming disengaged for movement on said second rail member.

7. The lifting assembly of claim 4 further including stop means for stopping said at least one wheel rotatable about a horizontal axis from becoming disengaged for movement on said first rail member.

8. The lifting assembly of claim 1 further including locking means for preventing said support frame from moving along said first rail member and said second rail member.

9. A lifting assembly for lifting an electrical switching apparatus for placement in an electrical cabinet having a front surface and a top surface, the lifting apparatus comprising:

a first rail member adapted to be horizontally disposed adjacent the top surface of the electrical cabinet, said first rail member generally parallel to and positioned adjacent the front surface of the electrical cabinet;

a second rail member adapted to be horizontally disposed adjacent the top surface of the electrical cabinet spaced from and generally parallel to said first rail member;

a support frame having a cantilevered end that extends generally transverse to said first rail member and is adapted to be cantilevered outwardly from the top surface of the electrical cabinet;

a winch attached to said support frame; and wheel means mounted on said support frame for movement of said support frame on said first rail member and said second rail member, wherein said wheel means includes at least one wheel rotatable about a horizontal axis for movement on said second rail member, and said wheel means also includes at least one wheel rotatable about a horizontal axis for movement on said first rail member and at least two wheels rotatable about vertical axes and spaced apart along said first rail member for movement on said first rail member to provide lateral stability and minimize binding of the lifting assembly.

10. The lifting assembly of claim 9 wherein said first rail member includes a top side and a first side and a second side both adapted to extend generally downwardly from said top side toward the top surface of the electrical cabinet, said at least one wheel rotatable about a horizontal axis positioned for movement on said top side of said first rail member, said at least two wheels rotatable about vertical axes positioned for movement on said first side and said second side of said first rail member.

11. The lifting assembly of claim 9 further including stop means for stopping said at least one wheel rotatable about a horizontal axis from becoming disengaged for movement on said second rail member.

12. The lifting assembly of claim 9 further including stop means for stopping said at least one wheel rotatable about a horizontal axis from becoming disengaged for movement on said first rail member.

13. The lifting assembly of claim 9 further including locking means for preventing said support frame from moving along said first rail member and said second rail member.

14. An electrical assembly comprising:

an electrical cabinet having a front surface and a top surface;

an electrical switching apparatus;

a lifting assembly for lifting said electrical switching apparatus for placement in said electrical cabinet, said lifting assembly comprising:

a first rail member horizontally disposed adjacent the top surface of the electrical cabinet, said first rail member generally parallel to and positioned adjacent the front surface of the electrical cabinet;

a second rail member horizontally disposed adjacent the top surface of the electrical cabinet spaced from and generally parallel to said first rail member;

a support frame;

wheel means mounted on said support frame for providing movement of said support frame along said first rail member and said second rail member;

a winch mounted on said support frame and having a spool;

a cable having a first end wound on said spool and a second end for lifting the electrical switching apparatus; and a pivotable, rotatable cable support member mounted upon said support frame over which said cable passes to provide even distribution of said cable on said spool.

15. The electrical assembly of claim 14 wherein said pivotable, rotatable cable support member is mounted to said support frame by a first pivot pin, said first pivot pin being generally axially aligned with said second end of said cable extending from said pivotable, rotatable cable support member to the electrical switching apparatus.

16. The electrical assembly of claim 15 wherein said pivotable, rotatable cable support member includes a pulley mounted on a second pivot pin, said second pivot pin positioned generally transverse to and offset from said first pivot pin.

17. The electrical assembly of claim 15 wherein said support frame includes a cantilevered end that extends generally transverse to said first rail member and cantilevered outwardly from the top surface of the electrical cabinet, said pivotable, rotatable cable support member is mounted by said first pivot pin to said cantilevered end of said support frame.

18. An electrical assembly comprising:

an electrical cabinet having a front surface and a top surface;

an electrical switching apparatus;

a lifting assembly for lifting said electrical switching apparatus for placement in said electrical cabinet, said lifting assembly comprising:

a first rail member horizontally disposed adjacent the top surface of the electrical cabinet, said first rail member generally parallel to and positioned adjacent the front surface of the electrical cabinet;

a second rail member horizontally disposed adjacent the top surface of the electrical cabinet spaced from and generally parallel to said first rail member;

a support frame having a cantilevered end that extends generally transverse to said first rail member and is cantilevered outwardly from the top surface of the electrical cabinet a winch attached to said support frame; and wheel means mounted on said support frame for movement of said support frame on said first rail member and said second rail member, wherein said wheel means includes at least one wheel rotatable about a horizontal axis for movement on said second rail member, and said wheel means also includes at least one wheel rotatable about a horizontal axis for movement on said first rail member and at least two wheels rotatable about vertical axes and spaced apart along said first rail member for movement on said first rail member to provide lateral stability and minimize binding of the lifting assembly.

* * * * *